Figure 1:
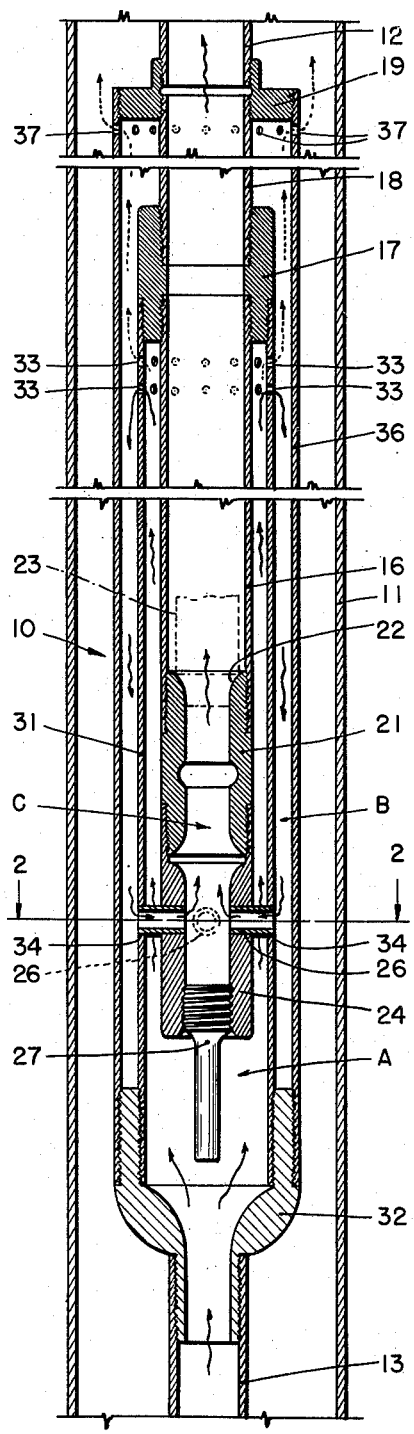

Oct. 10, 1950   S. A. MILLER   2,525,233
GAS AND OIL SEPARATOR
Filed June 16, 1947

INVENTOR
SIDNEY A. MILLER
BY
ATTORNEY

Patented Oct. 10, 1950

2,525,233

UNITED STATES PATENT OFFICE 2,525,233

GAS AND OIL SEPARATOR

Sidney A. Miller, Midway City, Calif.

Application June 16, 1947, Serial No. 754,825

5 Claims. (Cl. 183—2.7)

The present invention relates to gas and oil separators in general and particularly to such separators designed to be positioned within the casing of an oil well. More particularly the invention comprises an improved gas and oil separator which, in a preferred form, seats the pumping unit deep in the well and increases its normal efficiency by separating the entrained gases in the oil before reaching the pump.

The use of gas and oil separators, commonly referred to as gas anchors, is today recognized as a desirable means of increasing production in an oil well. Not so many years ago such separators or anchors were run only as a remedial measure or to aid in the operation of an adjoining well.

In the pumping of oil from a well inevitably volumes of gas are entrained in the oil stream which move upwardly with it in the manner of a percolator. Upon reaching the pumping unit the entrained gas permits the pump to race and to perform no useful work. To eliminate these bubbles or gaseous bodies and to maintain a more nearly constant load upon the pumping mechanism would not only remove unnecessary strains from the pumping mechanism but would also increase its output. Additionally, there is the problem of minimizing the disturbances of silt, etc. in the well and the maintenance of an even unagitated flow serves particularly in this connection.

The gas and oil separators of the prior art have not successfully stabilized the flow of oil and, while they have in certain instances improved the efficiency of the well, they have failed to obtain optimum results. With an appreciation of the desirable results to be obtained by efficient gas and oil separation within the well and, further, with appreciation of the defects which characterize the prior art constructions, it is an object of the present invention to provide a new and improved gas and oil separator for oil wells.

It is another object of the invention to provide a new and improved gas and oil separator for oil wells which supports the pump unit within the well and below the natural oil level and by which the entrained gas bodies are separated from the oil flow before reaching the pump.

A still further object of the invention is to provide a gas anchor for oil wells in which the oil flows in a continuous stream through the pump, first passing through a gas separation chamber in which entrained gas bodies are permitted to escape.

A still further object of the invention is to provide a simplified gas and oil separator of maximum efficiency.

These and other more specific objects will appear upon reading the following specification and claims and upon considering in connection therewith the attached drawings to which they relate.

Figure 2:
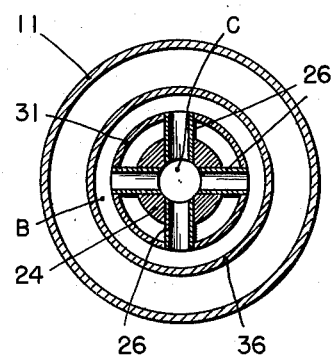

Referring now to the drawings in which a preferred exemplary embodiment of the invention is illustrated:

Figure 1 is a vertical longitudinal section through a portion of an oil well casing in which is positioned a gas anchor constructed in accordance with the present invention; and Figure 2 is a transverse section upon the line 2—2 of Figure 1.

Referring again to the drawing an oil well casing positioned well below the ground level is shown in section and is indicated by the reference character 11. Such casings extend downwardly into the earth for many thousand feet, the distance sometimes running into miles as is well known in the art. The particular length shown represents a portion of the casing below the natural oil level. Within casing 11 is positioned a gas anchor constructed in accordance with the present invention and indicated generally by the reference character 10. Anchor 10 is located between an upper string of oil-conducting tubing 12 and a lower string 13 and is removably connected thereto as will be described.

Anchor 10 is so constructed as to provide three chambers which are indicated by the characters A, B and C, which may be called, respectively, the entrance chamber, the gas separation chamber, and the pumping or pump suction chamber. In the normal operation oil flows through the chambers in the order mentioned. An inner pipe 16 of substantially the same diameter as upper tubing 12 is interiorly threaded into a Y coupling 17 at its upper end, which coupling in turn is connected by a short length nipple 18 to a Y coupling 19, itself threadedly seating the lower end of tubing 12. Nipple 18 and pipe 16 in effect form a continuation of tubing 12 and connect it directly to a pump shoe 21. The latter, in external appearance is like a coupling with threaded ends, being provided with an internal bore merging into a smoothly expanding curved pump seat 22 at its upper end. A suitable pump 23 is seated upon seat 22 and is suitably provided with electrical power from an exterior source. A tail piece 24 threadedly connects to the lower end of shoe 21 and is provided with a similar internal bore and in addition thereto is formed with a plurality of radially extending transverse ports or passageways 26. In the illustrated embodiment the lower end of tail piece 24 is closed by a screw plug 27. Pumping or suction chamber C, previously mentioned, is formed by the interior bore of shoe 21.

Concentrically enclosing the pipe or conduit 16 and extending below the lower end of plug 27 is an intermediate pipe or conduit 31 which may be referred to as the gas separator jacket. The upper end of separator jacket 31 is interiorly threaded and connects to Y coupling 17 and its interiorly threaded lower end connects to a third and lowermost Y coupling 32 which, in turn, is threadedly connected at its lower end to the lower string of tubing 13. Adjacent its upper end and below the coupling 17 jacket 31 is provided with a multiplicity of circumferentially spaced perforations or openings 33. Additionally, and opposite the tail piece 24, it is formed with openings 34 through which transverse tubes 26 extend in sealed relationship, the tubes opening at their inner ends to suction chamber C. Aforementioned entrance chamber A comprises the space within pipe 31 and around pipe 16 and its connected parts. The chamber may be said to extend upwardly from the nipple 32 to the perforations 33.

Positioned concentrically about separator jacket 31 and threadedly connected at its interiorly threaded ends to coupling 19 and to lower coupling 32 is an external shell or tubing 36 which, in the manner of jacket 31, is formed with a plurality of perforations or ports 37 near its upper end and specifically immediately adjacent and below coupling 19. The space between separator jacket 31 and external shell 36 comprises the separator chamber B which is interiorly connected to chamber A through perforations 33 and to exterior space within the casing 11 by the perforations 37.

The described construction makes possible a continuous flow of oil upwardly within the well. Oil is forced by the pressure within the well upwardly through lower tubing 13 and into entrance chamber A in which it rises upwardly past tail piece 24 and pump shoe 21 to pass outwardly through the openings 33 into the surrounding separation chamber B. The transverse tubes 26 are sealed to tail piece 24 and to jacket 31 and the oil in passing through chamber A cannot enter pumping chamber C.

Upon passing through the perforations 33 into the separation chamber B any entrained gas escapes from the oil and passes through the perforations or ports 37 into the surrounding casing from which it may pass to the ambient atmosphere at the top of the casing. The oil, now freed from gas, travels downwardly in chamber B and is drawn through ports 26 and into pumping chamber C by the suction created by the pump 23. The oil is forced upwardly by pump 23 through pipe 26, nipple 18 into pipe 12 and therethrough to the top of the well.

The gas and oil are forced by the natural pressure head in the well upwardly through chamber A, through perforations 33 and into separation chamber B and it is from the latter chamber that the pump 23 actually pumps the oil. As that chamber is constantly supplied with a head pump 23 will at all times be loaded and variations and fluctuations in its speed and output are eliminated and its efficiency correspondingly increased. Additionally, the disturbing effects upon the silt, etc. by irregular oil flow within the well is minimized and the possibility of a gas lock positively eliminated.

When the well is first placed in operation the oil level may be above the top of the gas anchor, that is, above the perforations 37. In that event, and until the level has been lowered below ports 37, oil will initially flow downwardly and through perforations 37 into separation chamber B from which it will then be drawn, as previously described. Once the level has been lowered, however, to a point below openings 37 the oil flow will be as described which is to be understood to be the normal operation of the device.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a self-contained gas and oil separator adapted for vertical displacement in an oil well casing, a body adapted to be connected to the oil-conducting tubing below the natural oil level and including means forming a central entrance chamber, means independent of any enclosing oil well casing forming a separation chamber positioned around and connected at its top to said entrance chamber, and means forming an inner central chamber adapted to receive a pump and to connect to oil-conducting tubing leading to the ground surface, and means connecting said separation chamber and said central chamber.

2. In a self-contained gas and oil separator adapted for vertical displacement in an oil well casing, a body adapted to be connected intermediate a string of oil-conducting pipes below the natural level in a well and formed interiorly as a continuous passage with a central upflow extension, an enclosing downflow, vertical extension, and an innermost upflow vertical extension, characterized in that at a junction of said upflow and downflow extensions escape means are provided for entrained gases.

3. In a self-contained gas and oil separator adapted for vertical displacement in an oil well casing, a body adapted to be connected intermediate a string of oil-conducting pipes below the natural level in a well and formed interiorly within itself as a continuous passage with upflow and downflow vertical extensions, characterized in that at the junction of an upflow and a downflow vertical extension escape means are provided for entrained gases, and in that a pair of said extensions are connected for flow transversely through an intermediate extension.

4. In a self-contained gas and oil separator adapted for vertical displacement in an oil well casing, a body adapted to be connected to oil-conducting tubing and including ported couplings at its opposite ends for that purpose, an outer tubing connecting said couplings, an inner tubing inside said outer tubing closed at one end and open to the port of one of said couplings, an intermediate tubing positioned between said inner and outer tubings and open at one end to the port of the other of said couplings, means closing the space between said inner and intermediate tubings at a point spaced from the connection of the latter and the coupling, and transverse conduit means extended through the space between said inner and intermediate tubings and connecting the interior of said inner tubing with the space between said intermediate and outer tubings.

5. The construction recited in claim 4 characterized in that said inner tubing is connected to a top coupling adapted to connect to a string of tubing leading upwardly to the ground surface, and further characterized in that the interior of said intermediate tubing is connected at its upper end to the passage formed between itself and said outer tubing.

SIDNEY A. MILLER.

REFERENCES CITED

The following references are of record in the file of this patent:

UNITED STATES PATENTS

| Number | Name | Date |
|---|---|---|
| 1,573,051 | Gignoux et al. | Feb. 16, 1926 |
| 1,592,079 | Chancellor et al. | July 13, 1926 |
| 1,698,444 | Lybyer | Jan. 8, 1929 |
| 2,170,881 | Werts | Aug. 29, 1939 |
| 2,271,832 | Shultz | Feb. 3, 1942 |
| 2,341,359 | Buckley | Feb. 8, 1944 |